(12) United States Patent
Son

(10) Patent No.: US 11,822,571 B2
(45) Date of Patent: *Nov. 21, 2023

(54) SYSTEMS AND METHODS FOR MANAGING EVENT STORAGE

(71) Applicant: Coupang Corp., Seoul (KR)

(72) Inventor: Jae Hyun Son, Seoul (KR)

(73) Assignee: COUPANG CORP., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/560,530

(22) Filed: Dec. 23, 2021

(65) Prior Publication Data

US 2022/0129477 A1 Apr. 28, 2022

Related U.S. Application Data

(63) Continuation of application No. 17/080,677, filed on Oct. 26, 2020, now Pat. No. 11,256,714.

(51) Int. Cl.
*G06F 16/27* (2019.01)
*G06F 16/23* (2019.01)
*G06Q 30/01* (2023.01)

(52) U.S. Cl.
CPC .......... *G06F 16/27* (2019.01); *G06F 16/2358* (2019.01); *G06F 16/2379* (2019.01); *G06Q 30/01* (2013.01)

(58) Field of Classification Search
CPC .. G06F 16/27; G06F 16/2379; G06F 16/2358; G06Q 30/01
See application file for complete search history.

(56) References Cited

U.S. PATENT DOCUMENTS

2005/0192816 A1* 9/2005 Wechsel ............... G06Q 10/087
  705/28
2006/0149577 A1 7/2006 Stashluk, Jr. et al.
(Continued)

FOREIGN PATENT DOCUMENTS

CN 106056345 A 10/2016
KR 10-2001-0039125 5/2001
(Continued)

OTHER PUBLICATIONS

Examination Notice dated Jun. 6, 2022, by the Hong Kong Patent Office in counterpart Hong Kong Application No. 22021031643.0, 4 pages.
(Continued)

*Primary Examiner* — Tamara T Kyle
*Assistant Examiner* — Lahcen Ennaji
(74) *Attorney, Agent, or Firm* — Finnegan, Henderson, Farabow, Garrett & Dunner, LLP

(57) ABSTRACT

A computer-implemented database system for storing data relating to a series of events may include a memory storing instructions and at least one processor configured to execute the instructions to perform a process. The process may include receiving data relating to a first return request initiated by a first customer via a first user device, and creating a first data structure for the first return request into a first database. The process may also include create a first event for the first return request, and storing the first event in the first data structure. The process may further include receiving data relating to an update associated with the first return request, creating a second event for the update, and inserting the second event into the first data structure.

20 Claims, 14 Drawing Sheets

(56) References Cited

U.S. PATENT DOCUMENTS

| | | |
|---|---|---|
| 2014/0046805 A1 | 2/2014 | Hu |
| 2015/0172059 A1 | 6/2015 | Tredoux et al. |
| 2016/0239237 A1 | 8/2016 | Gong et al. |
| 2019/0102421 A1 | 4/2019 | Sonawane et al. |
| 2019/0325055 A1 | 10/2019 | Lee et al. |
| 2020/0250671 A1* | 8/2020 | Thomas ............. G06Q 20/4014 |
| 2020/0320098 A1 | 10/2020 | Sharma et al. |
| 2020/0320657 A1 | 10/2020 | Lu |

FOREIGN PATENT DOCUMENTS

| | | |
|---|---|---|
| KR | 10-2006-0116950 A | 11/2006 |
| KR | 10-2020-0093561 | 8/2020 |
| WO | WO 2010/138034 A1 | 12/2010 |
| WO | WO 2016/157466 A1 | 10/2016 |

OTHER PUBLICATIONS

Rejection Decision dated Aug. 25, 2022, by the Taiwan Patent Office in counterpart Taiwanese Application No. 110115277, 7 pages.
Notice of Allowance dated Mar. 7, 2022, by the Korean Intellectual Property Office in counterpart Korean Application No. 10-2021-7019379, 7 pages.
Notice of Preliminary Rejection issued in Korean Patent Application No. 10-2021-7019379 dated Nov. 24, 2021, 13 pages.
International Search Report and Written Opinion for counterpart application No. PCT/IB2020/060413 dated Jul. 21, 2021, 7 pages.
Office Action dated May 11, 2022, by the Taiwanese Patent Office in counterpart Taiwanese Application No. 110115277, 17 pages.

* cited by examiner

600

- 601 RECEIVE DATA RELATING TO A FIRST RETURN REQUEST INITIATED BY A FIRST CUSTOMER VIA A FIRST USER DEVICE
- 603 CREATE A FIRST DATA STRUCTURE FOR THE FIRST RETURN REQUEST INTO A FIRST DATABASE
- 605 CREATE A FIRST EVENT FOR THE FIRST RETURN REQUEST
- 607 STORE THE FIRST EVENT IN THE FIRST DATA STRUCTURE
- 609 RECEIVE DATA RELATING TO AN UPDATE ASSOCIATED WITH THE FIRST RETURN REQUEST
- 611 CREATE A SECOND EVENT FOR THE UPDATE
- 613 ATTACH THE SECOND EVENT TO THE FIRST DATA STRUCTURE

FIG. 6

SYSTEMS AND METHODS FOR MANAGING EVENT STORAGE

CROSS-REFERENCE TO RELATED APPLICATIONS

This application is a continuation of and claims the benefit of priority to U.S. application Ser. No. 17/080,677, filed Oct. 26, 2020, the contents of which are hereby incorporated by reference in their entirety.

TECHNICAL FIELD

The present disclosure generally relates to computerized systems and methods for storing information and data. In particular, embodiments of the present disclosure relate to inventive and unconventional systems relate to storing event data into a novel data structure stored in synchronized databases, and managing requests for reading and updating the data structure in the synchronized databases.

BACKGROUND

In an asynchronous system that utilizes a server, it may be difficult to manage access of the same data by multiple devices given the limited resource of the service, including, for example, the computing power and the network capacity for transmitting the data to those devices. For example, processing a return request initiated by a customer through an online platform system may involve multiple steps, such as creating a shipping label for the return, sending the shipping label and instructions to the customer, tracking the package of the returned item, receiving the package, examining the returned item, issuing the refund, etc. These steps may be managed by different departments, which may all access the same set of data and information relating to the return process. Additionally, the customer may check the return status through the online platform system, which may also involve obtaining certain data relating to the return process. The problems may be exacerbated when the data needs to be updated, which may further restrain the server's resources. Additionally, it may also be challenging to determine the status of a process that includes multiple events when more than one device attempts to update the events at the same time, which in some instances may create inconsistent and/or conflicting updates.

Therefore, there is a need for improved methods and systems for accessing and updating data more efficiently and effectively.

SUMMARY

One aspect of the present disclosure is directed to a computer-implemented database system for storing data relating to a series of events. The system may include a memory storing instructions and at least one processor configured to execute the instructions to perform a process. The process may include receiving data relating to a first return request initiated by a first customer via a first user device, and creating a first data structure for the first return request into a first database. The process may also include create a first event for the first return request, and storing the first event in the first data structure. The process may further include receiving data relating to an update associated with the first return request, creating a second event for the update, and inserting the second event into the first data structure.

Another aspect of the present disclosure is directed to a computer-implemented method for storing data relating to a series of events. The method may include receiving data relating to a return request initiated by a customer via a user device, and creating a first data structure for the return request into a first database. The method may also include creating a first event for the return request, and storing the first event in the first data structure. The method may further include receiving data relating to an update associated with the return request, creating a second event for the update, and inserting the second event into the first data structure.

Yet another aspect of the present disclosure is directed to a computer-implemented database system for storing data relating to a series of events. The system may include a memory storing instructions and at least one processor configured to execute the instructions to perform a process. The process may include receiving data relating to a return request initiated by a customer via a user device, and creating a data structure for the return request into a first database. The data structure may include one or more entries for one or more events relating to the return request. The process may also include synchronizing the first data structure stored in the first database with a second data structure stored in a second database. The process may further include receiving, from the user device, an inquiry for a status of the return request, and in response to the received inquiry, obtaining, from the second data structure stored in the second database, information relating to the one or more events. The process may also include generating, based on the obtained information relating to the one or more events, a message indicating the status of the return request, and transmitting, to the user device, the message.

Other systems, methods, and computer-readable media are also discussed herein.

BRIEF DESCRIPTION OF THE DRAWINGS

FIG. 6 illustrates a flowchart of an exemplary process for updating a data structure, consistent with some embodiments of the present disclosure.

DETAILED DESCRIPTION

Figure 1A:
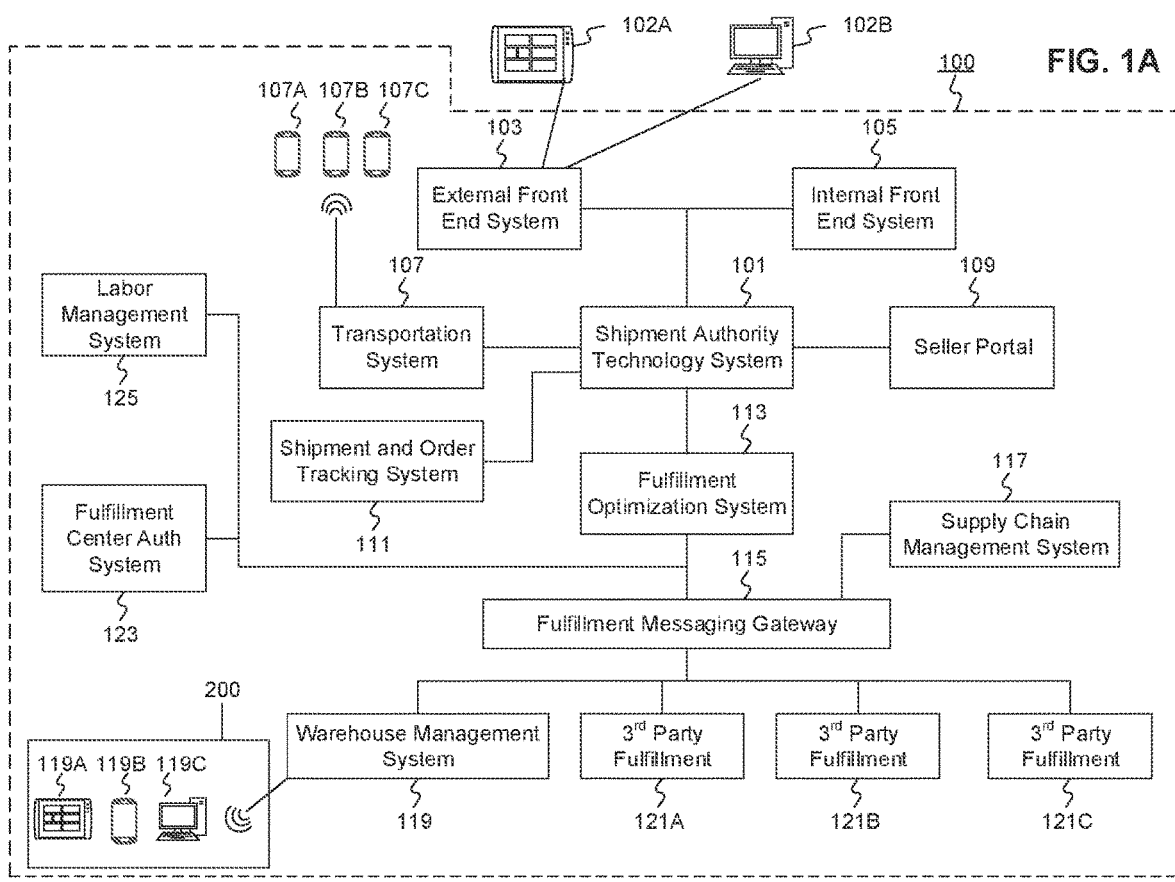
FIG. 1A is a schematic block diagram illustrating an exemplary embodiment of a network comprising computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Display Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for storage databases for storing data relating to events.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), 3$^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
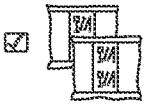
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with some embodiments of the present disclosure.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 1026) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or 3$^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
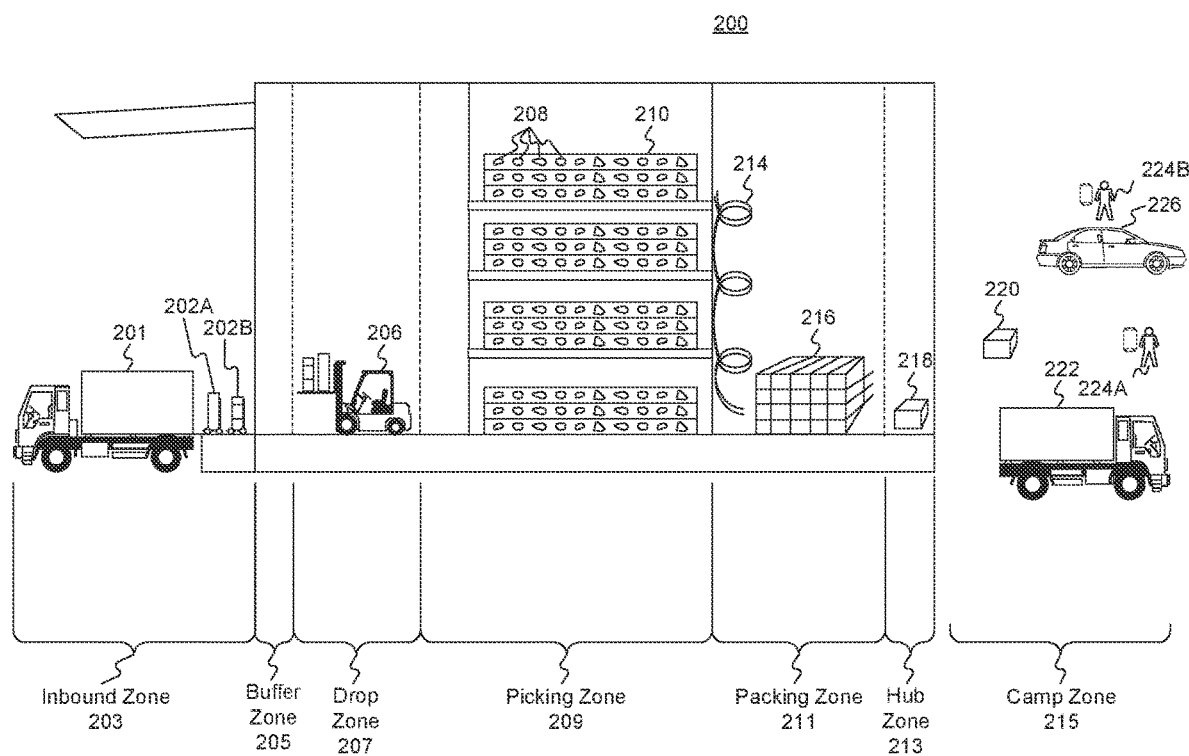
FIG. 2 is a diagrammatic illustration of an exemplary fulfillment center configured to utilize disclosed computerized systems, consistent with some embodiments of the present disclosure.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3A:
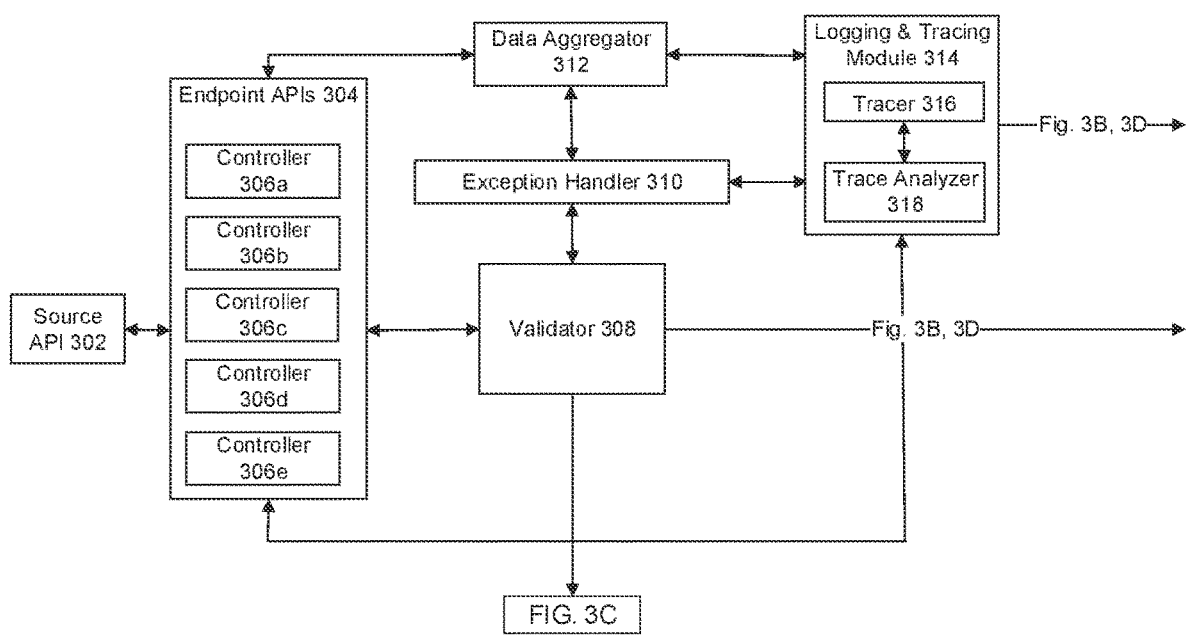
FIG. 3A illustrates an exemplary pictographic representation of an intake sub-system 300, consistent with some embodiments of the present disclosure.

FIG. 3A illustrates an exemplary pictographic representation of an intake sub-system 300. Intake sub-system 300 may be designated for initial processing of a communication from a source application program interface (API) 302. Source API 302 may be any one of a number of APIs, which may be specifically configured for use by a consumer, a delivery-person, an administrator, and/or a seller. Source API 302 may be implemented on a computing device having a processor, memory component, and/or communications component, such as a mobile device, a desktop computer, an adapter, a controller, a server, or any other device capable of sending and/or receiving API communications. In some embodiments, intake sub-system 300 and/or components of intake sub-system 300 may be communicably coupled to other sub-systems (e.g., as described in FIGS. 3B-3D).

Intake sub-system 300 may also include a number of endpoint APIs 304, to which source API 302 may be communicably coupled. In some embodiments, endpoint APIs 304 may only be a single endpoint API. Endpoint APIs 304 may include a plurality of controllers, adapters, and/or other computing devices, which may be managed by an API provider (not shown). For example, endpoint APIs 304 may be implemented by a combination of controllers, such as controller 306a, controller 306b, controller 306c, controller 306d, and/or controller 306e. In some embodiments, a controller may be designated for handling operations for a particular entity (e.g., a seller). A controller may be a hardware device or a software program, which may manage dataflows between different entities (e.g., between source API 302 and data aggregator 312). For example, a controller may be, without limitation, a flash controller, an application delivery controller, a primary domain controller, a baseboard management controller, and/or a session border controller. In some embodiments, a communication from source API 302 may be directed to a specific endpoint API or controller based on a source associated with the communication. For example, an API provider may receive a communication from a source API 302 and may determine (e.g., based on a message identifier, IP address, MAC address, communication format, and/or other unique identifier) a source and/or type of the communication. Based on the identified communication source and/or communication type, the API provider may direct the communication to a particular controller, which may be configured for communications of having a particular source and/or type. By way of further example, API provider may determine that a communication from source API 302 has a consumer device as its communication source and a return request as its communication type, and may direct the communication to an endpoint API 304 (e.g., controller 306b), which may be configured for handling communications having a source and/or type of the received communication (e.g., configured for return request communications).

Intake sub-system 300 may also include a validator 308, which may validate communications from a source API 302, and may be communicably coupled to endpoint APIs 304. Validator 308 may exist within an endpoint API 304 (e.g., as part of a controller), or may exist as a separate component, such as a server, to which an endpoint API 304 may be connected. Validator 308 may include various components (e.g., modules, devices, processors, etc.) configured to carry out a validation process (e.g., a process for validating communications received from a source API 302). For example, validator 308 may include a validator invoker, a validation pre-processor (e.g., for re-formatting data from a communication), a validator processor (e.g., for performing validation operations to data), a validator post-processor (e.g., for re-formatting validated data to a format understandable by another entity, such as rule engine 362 in FIG. 3C), a validation manager, and/or a message publisher (which may direct messages to another sub-system).

Intake sub-system 300 may also include an exception handler 310, to which validator 308 may be communicably coupled. Exception handler 310 may be part of validator 308, or may be a separate device or component, such as a server or mobile device. In some embodiments, validator 308 may direct a communication to exception handler 310 based on a validation result of a communication, which may have been determined by validator 308. For example, if a communication fails at least one rule or algorithm implemented by validator 308, validator may direct the communication to exception handler 310. In some embodiments, exception handler 310 may be configured re-format, split, parse, tag, and/or otherwise re-configure or transmit information from the communication (e.g., issuing an alert to an administrator device) based on the at least one rule or algorithm failed by the communication. Exception handler 310 may be communicably coupled to a data aggregator 312 and/or a logging & tracing module 314.

Intake sub-system 300 may also include a data aggregator 312, which may aggregate data from different sources, such as endpoint APIs 304, exception handler 310, and/or logging & tracing module 314. Data aggregator 312 may be communicably coupled to any device and/or component of sub-system 300, as well as devices and/or components of other systems including sub-systems 325 in FIG. 3B, 355 in FIG. 3C, and 375 in FIG. 3D. Data aggregator 312 may be part of a device having another purpose (e.g., validator 308), or may be a separate device or component, such as a server or mobile device. In some embodiments, data aggregator 312 may include various components (e.g., modules, devices, processors, etc.) configured to carry out a data aggregation process (e.g., a process for aggregating and/or analyzing data from sources such as a source API 302 and/or exception handler 310). For example, data aggregator 312 may include a data caching component, a data aggregator component, a data transformation component, a data mapping component, and/or a service router.

Intake sub-system 300 may also include a logging & tracing module 314, which may log and/or trace data associated with communications (e.g., communications from an API source 302). Logging & tracing module 314 may be part of a device having another purpose (e.g., data aggregator 312), or may be a separate device or component, such as a server or mobile device. In some embodiments, logging & tracing module 314 may include various components (e.g., modules, devices, processors, etc.) configured to carry out a data aggregation process (e.g., a process for tracing and/or logging data from sources such as a source API 302 and/or exception handler 310). For example, logging & tracing module 314 may include tracer 316 and/or trace analyzer 318.

Tracer 316 may perform functions to trace data, such as data associated with a communication from an API source 302, validator 308, etc. In some embodiments, tracer 316 may be configured to add trace identifiers and/or span identifiers to data associated with a communication. In some embodiments, tracer 316 may maintain definitions (e.g., user-defined, machine-defined, and/or a combination of user-defined and machine-defined) related to logging and tracing, such as definitions for where to transmit trace and/or log data, a threshold number of traces and/or logs to keep, data formats, particular combinations of identifiers to transmit, and/or particular libraries to trace. In some embodiments, tracer 316 may implement aspects of a function provider, such as Spring Cloud Sleuth.

Trace analyzer 318 may perform functions to analyze data, such as trace data and/or log data, which may be associated with communications from a device (e.g., a device implementing source API 302). For example, trace analyzer 318 may aggregate timing data (e.g., times when an exception occurred, exception frequency, etc.), a tag, rule failure data, rule satisfaction data, a device identifier, a message identifier, and/or any data associated with a source API 302. In some embodiments, trace analyzer 318 may generate visual representations of trace and/or log data (e.g., charts of filterable data, line diagrams, recommendations generated by statistical and/or machine learning algorithms, etc.). In some embodiments, trace analyzer 318 may implement aspects of a function provider, such as Zipkin.

Figure 3B:
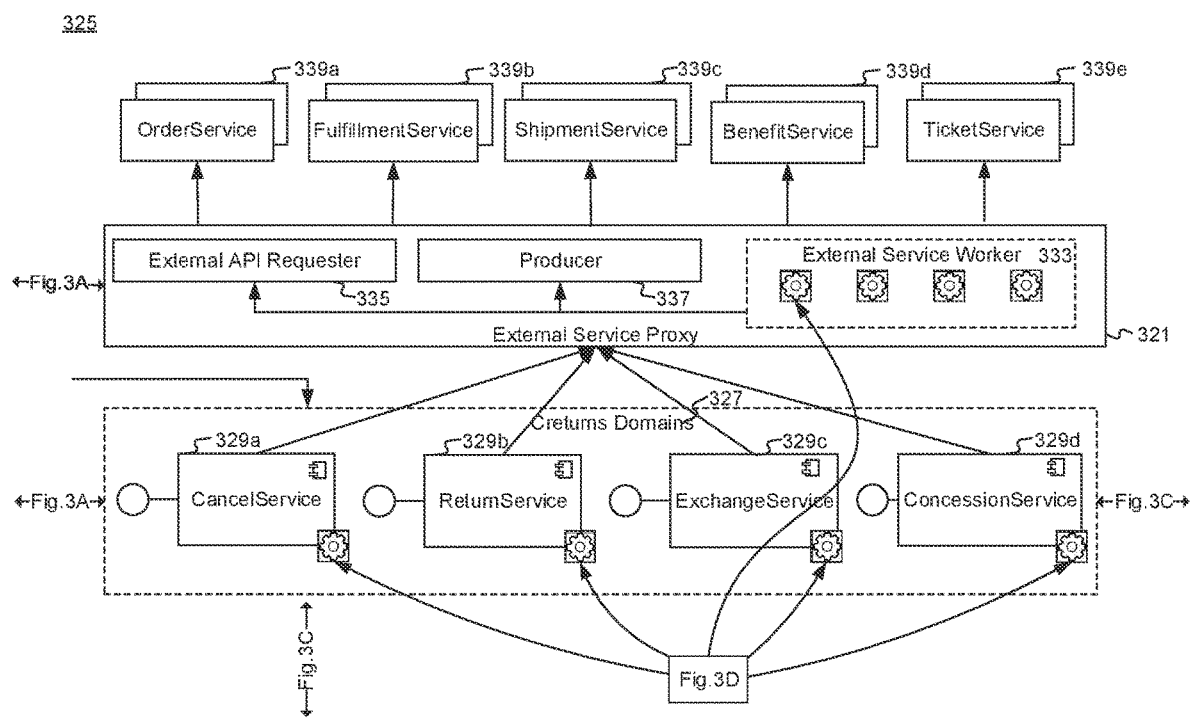
FIG. 3B illustrates an exemplary pictographic representation of an output sub-system 325, consistent with some embodiments of the present disclosure.

FIG. 3B illustrates an exemplary pictographic representation of an output sub-system 325. Output sub-system 325 may be designated for processing output of the workflow sub-system 375 in FIG. 3D. Output sub-system 325 may pass processed output to external data sources 370 in FIG. 3C, pass processed output to be logged and/or traced with the logging & tracing module 314 in FIG. 3A and/or one or more of the external services 339*a-e*. Output sub-system 325 may be specifically configured for use by a consumer, a delivery-person, an administrator, and/or a seller. Output sub-system 325 may be implemented on a computing device having a processor, memory component, and/or communications component. In some embodiments, output sub-system 325 and/or components of output sub-system 325 may be communicably coupled to other sub-systems (e.g., as described in FIGS. 3A-3D).

Figure 3C:
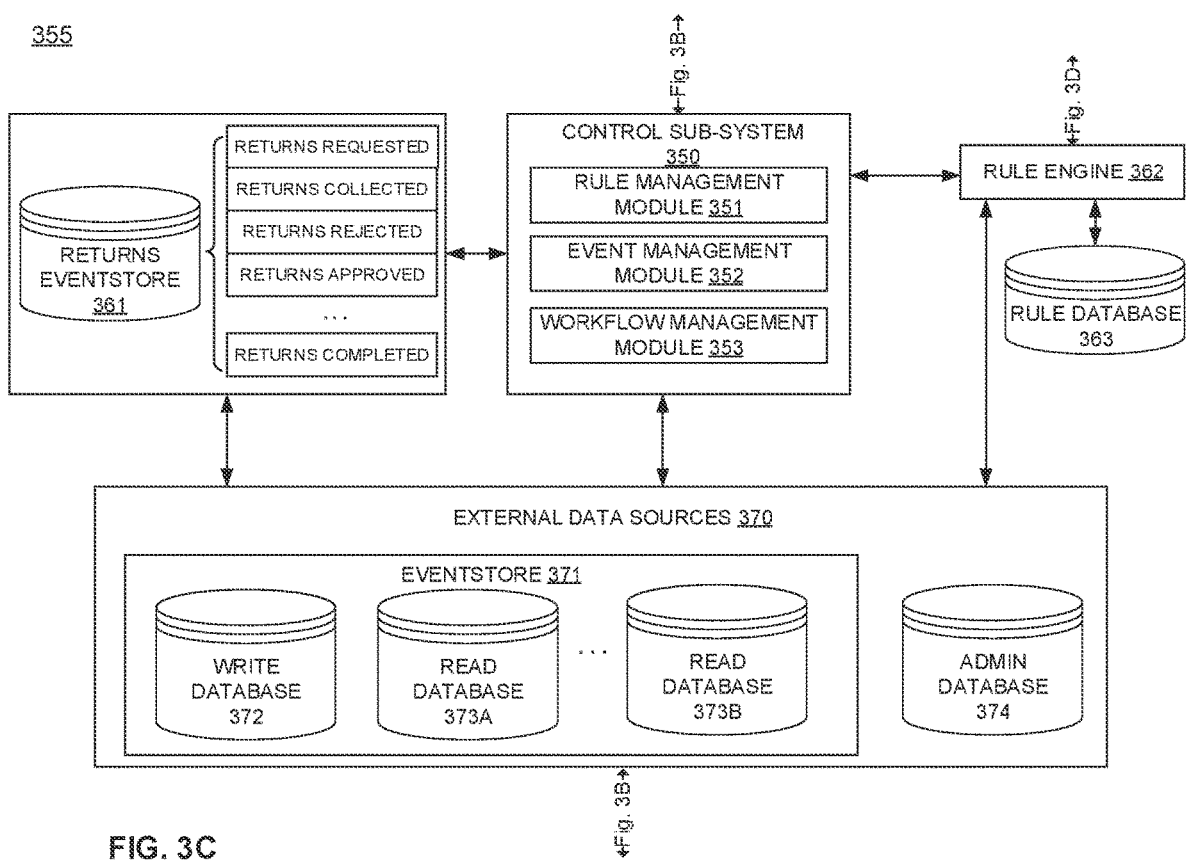
FIG. 3C illustrates a pictographic representation of an exemplary control sub-system, an exemplary returns event store, an exemplary rule engine, and exemplary external data sources, consistent with some embodiments of the present disclosure.
Figure 3D:
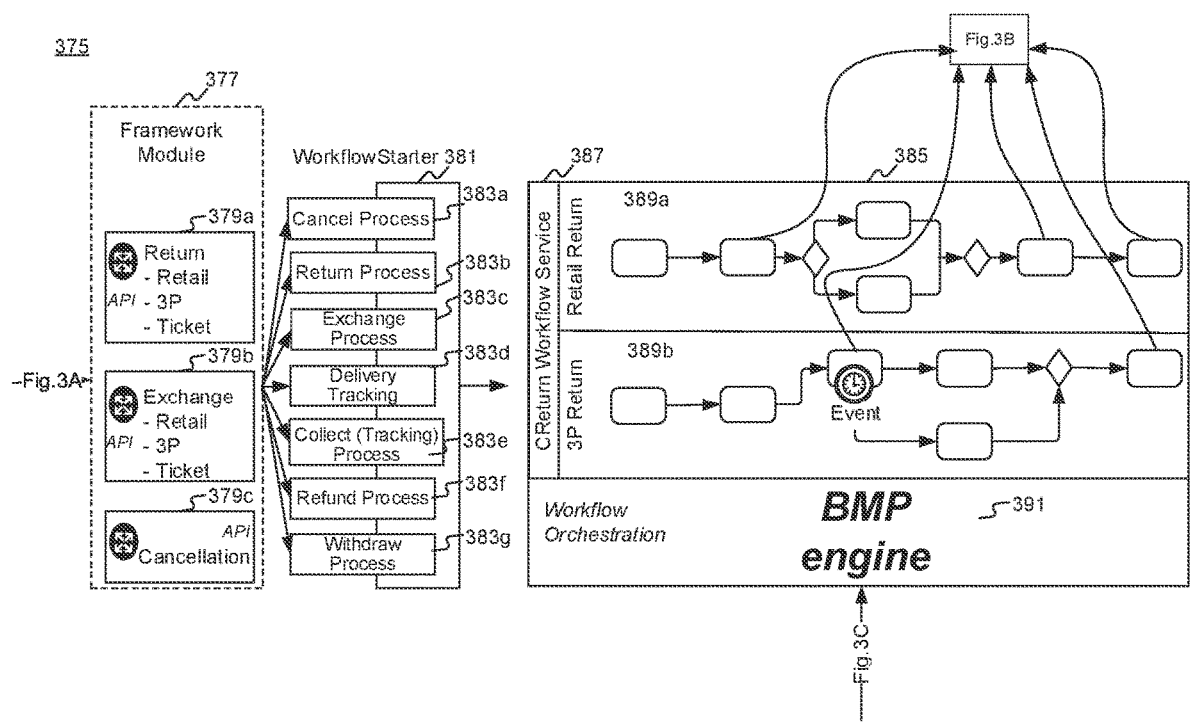
FIG. 3D illustrates an exemplary pictographic representation of a workflow sub-system 375, consistent with some embodiments of the present disclosure.

Output sub-system 325 may include a number of Creturns Domains module 327, which may be communicably coupled to workflow sub-system 375 in FIG. 3D. In some embodiments, Creturns Domains module 327 may comprise a variety of services 329*a-d*. Examples of services as illustrated on FIG. 3B may include CancelService 329*a*, ReturnService 329*b*, ExchangeService 329*c*, and/or ConcessionsService 329*d*. Each of the services 329*a-d* may be responsible for processing output from the respective workflow tasks in workflow sub-system 375 in FIG. 3D. For example, cancel process workflow 383*a* in FIG. 3D may pass an output to CancelService 329*a*, while return process workflow 383*b* in FIG. 3D may pass an output to ReturnService 329*b*. Architecture of Creturns Domains module 327 be modified to add additional services as needed.

Creturns Domains module 327 may pass processed information to external data sources 370 in FIG. 3C, logging and tracing with logging & tracing module 314 in FIG. 3A and/or external service proxy module 331. Information passed to external data sources 370 is stored as described in section with reference to FIG. 3C. Information passed to logging & tracing module 314 is logged and processed as described earlier in section with reference to FIG. 3A.

External service proxy module 331, which is a part of output sub-system 325, may receive processed output from Creturns Domains module 327 for further direction to an appropriate external service 339*a*-339*e*. Output sub-system 325 may use external service proxy module 331 to connect repeatedly to the same service without the expenditure of time and computing resources required for initializing a service proxy more than once. External service proxy module 331 may be implemented as a software or a hardware system between Creturns Domains module 327 and external services 339*a*-339*e*. External service proxy module 331 may exist on the same machine as output sub-system 325 or on a separate server. External service proxy module 331 may be specifically configured for use by a consumer, an administrator, and/or a seller. External service proxy module 331 may be implemented on a computing device having a processor, memory component, and/or communications component.

External service proxy module 331 may also include an external service worker 333, which may receive data directly from the Creturn WorkflowStarter 381 in FIG. 3D and may be communicably coupled to workflow sub-system 375 in FIG. 3D. External service worker 333 may exist within an external service proxy module 331, or may exist as a separate component, such as a server, to which an external service proxy module 331 may be connected. External service worker 333 may include various components (e.g., modules, devices, processors, etc.) configured to carry out output processing. For example, external service worker 333 may process data that is not processed by the Creturns Domains module 327.

External service proxy module 331 may also include an external API requester 335, to which external service worker 333 may be communicably coupled. External API requester 335 may be part of external service proxy module 331, or may be a separate device or component, such as a server or a virtual instance. In some embodiments, external service proxy module 331 may have a direct communication to external API requester 335 based on which of the external services 339*a-e* is required to pass the output to, which may have been determined by Creturns Domains module 327 or external service worker 333. For example, if external service required an API for communication, external API requester 335 may request appropriate API information to establish a connection with the required external service. In some embodiments, external API requester 335 may be configured to re-format, split, parse, tag, and/or otherwise re-configure or transmit information from the communication based on at least one rule or algorithm used by the external service.

External service proxy module 331 may also include a Producer 337, to which external service worker 333 may be communicably coupled. Producer 337 may be part of external service proxy module 331, or may be a separate device or component, such as a server or a virtual instance. Producer 337 is used to publish messages to topics. Topics may be divided into a number of partitions, which contain messages. Each message in a partition is assigned and identified by its unique offset. The message itself contains information about what topic and partition to publish to so data can be published to different topics with the same producer. In some embodiments, Producer 337 may be implemented using Kafka.

External service proxy module 331 may pass processed information to logging & tracing module 314 in FIG. 3A and/or external services 339*a-e*. Information passed to logging & tracing module 314 is logged and processed as described earlier in in section with reference to FIG. 3A. External services 339*a-e* initiate actions based on the requests. Examples of services as illustrated on FIG. 3B may include OrderService 339*a*, FulfillmentService 339*b*, ShipmentService 329*c*, BenefitService 339*d* and/or TicketService 339*e*. Each of the services 329*a-d* may be responsible for initiation of specific actions. For example, in the event, workflow sub-system 375 in FIG. 3D passes an output for ExchangeService 329*c* processing, it may initiate a number of external services. Exchange of an item may involve an output to OrderService 339*a* to order (order instruction may include instruction to buy an item from a supplier, inform a picker to prepare the item, purchase the item online, go to a $3^{rd}$ party store and pick it up, or other instructions directed to acquiring an item) a new item, output to ShipmentService 339*c* to generate a return shipping label, and/or an output to FulfillmentService 339*b* to process returned item. Architecture of output sub-system 325 may be modified to add additional external services as needed.

FIG. 3C illustrates a pictographic representation of an exemplary control sub-system 350, an exemplary returns eventstore 361, an exemplary rule engine 362, and exemplary external data sources 370, consistent with disclosed embodiments.

Control sub-system 350 may be configured to create, update, maintain, and/or manage data used by various components of system 300 in FIG. 3A, 325 in FIG. 3B, and 375 in FIG. 3D. For example, control sub-system 350 may be configured to create, update, and/or modify parameters for managing returns by customers (e.g., rules for approving and rejecting a return by a customer), managing workflows for processing returns, and/or storing specific return events.

As illustrated in FIG. 3C, control sub-system 350 may include a rule management module 351, an event management module 352, and a workflow Management module 353.

Rule management module 351 may be configured to manage rules for processing returns by customers. For example, rule management module 351 may be configured to create and/or modify a rule for declining a return request by a customer. By way of example, rule management module 351 may be configured to create and/or modify a rule for declining a return request by a customer based on various parameters, including, for example, the data relating to the customer's previous return(s), the monetary amount involved in the return request, the type of the goods to be returned, etc. For example, rule management module 351 may create a rule for declining a return request by a customer if the customer returned an empty (or partially empty) box for a return within a predetermined number of days in the past (e.g., 180 days), which may indicate the customer may have attempted to defraud the system.

In some embodiments, rule management module 351 may be configured to create and/or modify a rule based on input by the user of control sub-system 350. For example, rule management module 351 may receive input from the user for modifying one or more parameters of a rule for validating return requests and modifying the parameter(s) of the rule accordingly.

Event management module 352 may be configured to create, modify, and/or manage events stored in returns eventstore 361. For example, event management module 352 may create a series of events for a return request initiated by a customer or the system and store the events into returns eventstore 361. By way of example, a customer may initiate a return of an order via a user device associated with the customer. Event management module 352 may create an event of receiving the return request and store the event in returns eventstore 361. In some embodiments, an event may include information relating to the return, the customer, and the order associated with the return. For example, event management module 352 may create a first event for a return requested by a customer, which may include the information of the return request, the time stamp of receiving the return request, the information relating to the customer, or the like, or a combination thereof. Event management module 352 may create a second event when one or more items subject to the return are received from the customer, which may include the information relating to the item(s) received (e.g., the quantity, condition, etc.), the time stamp of receiving the item(s), etc. Event management module 352 may also store the first and second event as a series of events relating to the return in returns eventstore 361.

In some embodiments, returns eventstore 361 may include, for example, Oracle™ databases, Sybase™ databases, or other relational databases or non-relational databases, such as Hadoop™ sequence files, HBase™, or Cassandra™ Returns eventstore 361 may include NoSQL databases such as HBase, MongoDB™ or Cassandra™. Alternatively, returns eventstore 361 may include relational databases such as Oracle, MySQL and Microsoft SQL Server. In some embodiments, returns eventstore 361 may take the form of servers, general purpose computers, mainframe computers, or any combination of these components.

Workflow management module 353 may be configured to create, modify, and/or manage workflows used by various components of system 300 in FIG. 3A, 325 in FIG. 3B, and 375 in FIG. 3D. For example, workflow management module 353 may be configured to create, modify, and/or manage cancel process 383a, return process 383b, exchange process 383c, delivery tracking 383d, collect process 383e, refund process 383f, and withdraw process 383g used by workflow sub-system 375 (illustrated in FIG. 3D).

In some embodiments, control sub-system 350 may be configured to create, modify, and/or manage services used by Creturns Domains module 327 (illustrated in FIG. 3B). For example, control sub-system 350 may be configured to create, modify, and/or manage CancelService 329a, ReturnService 329b, ExchangeService 329c, and/or ConcessionsService 329d. Creturns Domains module 327 may obtain one or more services from control sub-system 350.

Rule engine 362 may be configured to obtain rules for processing returns from control sub-system 350, and store and/or manage the rules for other components of the workflow sub-system 375 in FIG. 3D. For example, the workflow sub-system 375 in FIG. 3D may be configured to obtain the rules for validating return requests from rule engine 362. In some embodiments, rule engine 362 may include a rule database 363 for storing the rules for managing and/or processing returns.

External data sources 370 may be configured to store data for various components of system including subsystems 300 in FIG. 3A, 325 in FIG. 3B, and 375 in FIG. 3D. For example, external data sources 370 may store various services created and/or updated by control sub-system 350, including, for example, CancelService 329a, ReturnService 329b, ExchangeService 329c, and/or ConcessionsService 329d. Creturns Domains module 327 may obtain one or more services from external data sources 370.

As another example, external data sources 370 may include an eventstore 371 configured to store data relating to events (e.g., return events). In some embodiments, eventstore 371 may include a write database (also referred herein as a command database) 372 configured to write data in response to write commands. Eventstore may also include one or more read databases 373 (also referred herein as a command database), including, for example read database 373A read database 373B, configured to read data only in response to query commands. In some embodiments, a read database 373 may include data that are the same as the data included in write database 372. For example, if the data stored in write database 372 are updated in response to a write command, the corresponding data in read database 373 may be updated accordingly such that write database 373 and read database 373 may include the same data. In some embodiments, external data sources 370 may include an admin database 374 configured to store administration data for control sub-system 350.

In some embodiments, eventstore 371 and/or admin database 374 may include, for example, Oracle™ databases, Sybase™ databases, or other relational databases or non-relational databases, such as Hadoop™ sequence files, HBase™, or Cassandra™ Eventstore 371 and/or admin database 374 may include NoSQL databases such as HBase, MongoDB™ or Cassandra™. Alternatively, eventstore 371 and/or admin database 374 may include relational databases such as Oracle, MySQL and Microsoft SQL Server. In some embodiments, eventstore 371 and/or admin database 374 may take the form of servers, general purpose computers, mainframe computers, or any combination of these components.

FIG. 3D illustrates an exemplary pictographic representation of a workflow sub-system 375. Workflow sub-system 375 may be designated for processing output of the intake sub-system 300. Workflow sub-system 375 may pass Validator 308 output to output sub-system 325. Workflow sub-system 375 may be specifically configured for use by a consumer, a delivery-person, an administrator, and/or a seller. Workflow sub-system 375 may be implemented on a computing device having a processor, memory component, and/or communications component. In some embodiments, workflow sub-system 375 and/or components of workflow sub-system 375 may be communicably coupled to other sub-systems (e.g., as described in FIGS. 3A-3D).

Workflow sub-system 375 may include a framework module 377. Framework module 377 may utilize Spring WebFlux or similar technology. Framework module 377 may provide for a non-blocking web stack to handle concurrency with a small number of threads and scale with fewer hardware resources. Framework module 377 may include a variety of programming modules. Examples of modules as illustrated in FIG. 3C may include return module 379a, exchange module 379b, and cancellation module 379c. Modules 379a-c may contain processing logic for retail, third party, and ticket offers. Modules 379a-c may also include an API for communication with sub-systems responsible for respective data.

Workflow sub-system 375 may also include a WorkflowStarter 381, which may be communicatively coupled to framework module 377. WorkflowStarter 381 may include a list of processes 383a-g, which may initiate workflows based on the input received from the framework module 377. Examples of processes as illustrated in FIG. 3C may include cancel process 383a (containing instructions for starting a workflow initiated by the cancelation of an order by the consumer, supplier, or other order handler), return process 383b (containing instructions for starting a workflow initiated by the complete or partial order return by the consumer, supplier, or other order handler), exchange process 383c (containing instructions for starting a workflow initiated by an exchange of complete or partial order started by the consumer, supplier, or other order handler), delivery tracking 383d (containing instructions for starting a workflow initiated by the request to track delivery status of a complete or partial order by the consumer, supplier, or other order handler), collect process 383e (containing instructions for starting a workflow initiated by the request for tracking information of a complete or partial order by the consumer, supplier, or other order handler), refund process 383f (containing instructions for starting a workflow initiated by a request for refund for a complete or partial order started by the consumer, supplier, or other order handler), and withdraw process 383g (containing instructions for starting a workflow initiated by a withdrawal of complete or partial order started by the consumer, supplier, or other order handler).

Furthermore, each of the programing modules 379a-c of framework module 377 may initiate a plurality of processes 383a-g. For example, cancelation module 379c may initiate delivery tracking process 383d to determine if the item that is being canceled was deliver or is still in possession of the delivery personnel. Same cancelation module 379c may also initiate refund process 383f for issuing a refund to the customer.

Various combinations may be programed and may be specifically configured for use by a consumer, a delivery-person, an administrator, and/or a seller. WorkflowStarter 381 may be implemented on a computing device having a processor, memory component, and/or communications component. In some embodiments, WorkflowStarter 381 and/or components of WorkflowStarter 381 may be communicably coupled to other parts of workflow sub-system 375 (e.g., as described in FIG. 3D). Furthermore, architecture of workflow sub-system 375 be modified to add additional processes and programing modules as needed.

Workflow sub-system 375 may also include a workflow service module 385, which may be communicably coupled to WorkflowStarter 381 and output sub-system 325. Workflow service module 385 may be designated for workflow control and design. Workflow service module 385 may include a Creturn workflow service module 387 and a workflow orchestration module 391. Workflow service module 385 may provide output for processing by output sub-system 325.

Creturn workflow service module 387 may include a number of sub-modules 389a-b which may control workflows based on the input received from the WorkflowStarter 381. Examples of processes as illustrated in FIG. 3C may include retail return sub-module 389a, which allows for design and/or control of the workflows for the return of retail items and third party return sub-module 389b, which allows for design and/or control of the workflows for the return of third party items. Architecture of Creturn workflow service module 387 be modified to add additional sub-modules as needed. Workflows within Creturn workflow service module 387 may be controlled, and/or designed by a consumer, a delivery-person, an administrator, and/or a seller. Creturn workflow service module 387 may be implemented on a computing device having a processor, memory component, and/or communications component and may be communicably coupled to other parts of workflow sub-system 375.

Workflow orchestration module 391 may include a set of workflow controls which may be accessed by a consumer, a delivery-person, an administrator, and/or a seller. Workflow orchestration module 391 may be implemented with a business process management (BPM) engine and supporting frameworks, one example of which may be Activiti with Spring Boot/Docker. A workflow orchestration module 391 engine has as core goal to take a process definition comprised of human tasks and service calls and execute those in a certain order, while exposing various API's to start, manage and query data about process instances for that definition. Workflow orchestration module 391 may be implemented on a computing device having a processor, memory component, and/or communications component. Workflow orchestration module 391 may be communicably coupled to other parts of workflow sub-system 375.

Figure 4:
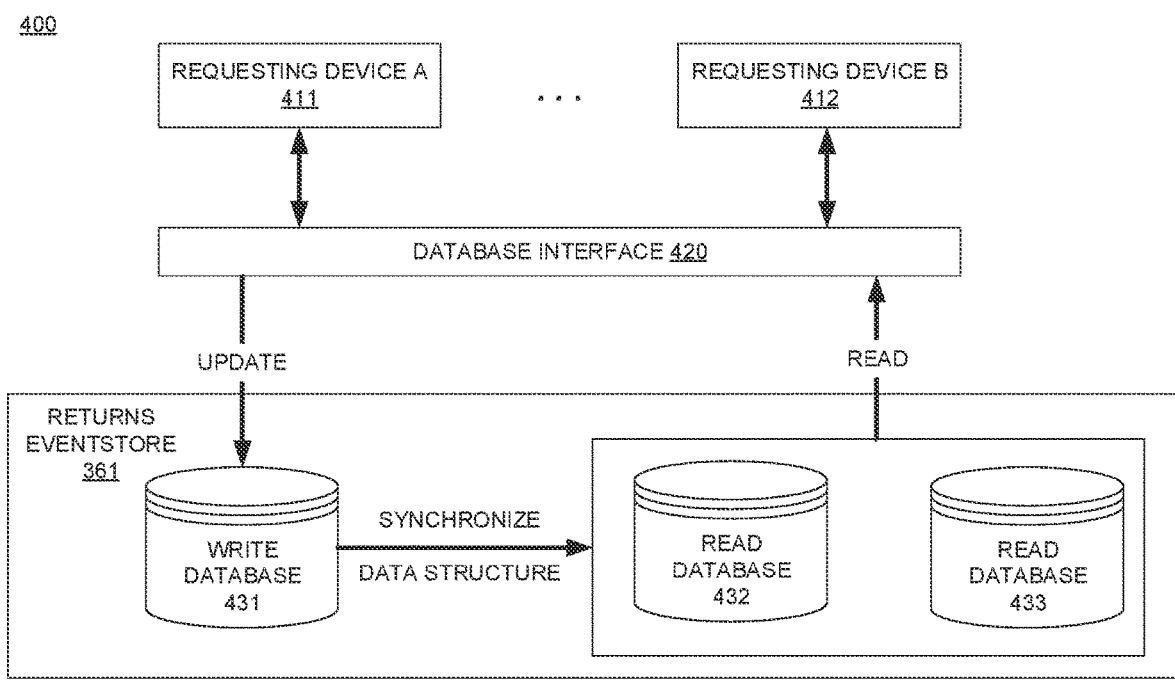
FIG. 4 illustrates a pictographic representation of an exemplary command and query system, consistent with some embodiments of the present disclosure.

FIG. 4 illustrates a pictographic representation of an exemplary command and query system 400, consistent with some embodiments of the present disclosure. Command and query system 400 may include one or more requesting devices (e.g., requesting device 411, requesting device 412), a database interface 420, and a returns eventstore 361. In some embodiments, command and query system 400 may be implemented using one or more components of sub-systems disclosed as described elsewhere in this disclosure (e.g., sub-systems 300, 325, 355, and 375).

A requesting device (e.g., requesting device 411) may transmit a request for creating and/or updating data relating to a return request. For example, requesting device 411 may be a device associated with a customer service representative, which may receive a request for returning an item from a user device associated with a customer. Requesting device 411 may create a return request for the customer and transmit a request for initiating a return process to database interface 420. As another example, requesting device 412 may be a user device associated with a customer, which may request a status update regarding a return request via a web page or an APP. The request may be transmitted to database interface 420 for further processing. In some embodiments, return module 379a may include a requesting device for handling return requests.

Database interface 420 may be configured to receive requests from requesting devices, and determine whether the request received from the requesting device is a command (i.e., a request for writing data into a database) or a query (i.e., a request for reading data from a database). For example, database interface 420 may receive a request for creating (and/or update) a record in a database for a return from requesting device 411. Database interface 420 may determine that the request is a command, which may require writing data into returns eventstore 361. As another example, database interface 420 may determine that a request received from requesting device 412, which may be a request for the return status for an existing return, is a query, which may only involve obtaining certain data from returns eventstore 361. In some embodiments, database interface 420 may determine whether a request is a command or a query based on an identifier included in the request. For example, a request may include an Application Program Interface (API) call including an identifier of a command (or a query). Database interface 420 may determine that the request is a command (or a query) based on the identifier. Alternatively or additionally, database interface 420 may determine whether a request is a command or a query based on the identity of the requesting device that sends the request. For example, database interface 420 may determine that the request was received from a user device and determine that the request is a query based on the identity of the user device.

In some embodiments, for a command, database interface 420 may instruct writing data into a write database 431 (also referred herein as a command database) of returns eventstore 361. For example, database interface 420 may create (and/or instruct write database 431 or a device associated with write database 431 to create) a data structure (e.g., data structure A 510 illustrated in FIGS. 5A and 5B) for a return request initiated by a customer or a customer service representative, and store the data structure into write database 431. Database interface 420 may also create one or more entries in the data structure for an event relating to the return. For example, database interface 420 may create a first entry for the initiation of the return process for a request, and a second entry for the approval (or denial) of the return request. As another example, a return process may have been initiated, and one or more items relating to the return may be received from the customer. Database interface 420 may receive a request from requesting device 411 (or other requesting device(s)) for updating the status of the return. Database interface 420 may update (or instruct write database 431 or a device associated with write database 431 to update) the data structure associated with the return.

An entry for an event may include information relating to the event including, for example, time information relating to the event (e.g., the time, date, and/or time zone relating to the event, etc.), information relating to the customer (e.g., the customer's user ID, order history, and/or return history, etc.), information relating to the original order associated with the return request (e.g., the item(s) to be returned, the condition of the item(s), the monetary amount of the item(s) to be returned, etc.), information relating to returned item(s) (e.g., the time and/or date of receiving the item(s), the condition of received item(s)), information relating to the transaction (e.g., the billing information, the shipping information, the refund (if any), etc.), or the like, or a combination thereof.

Database interface 420 may also be configured to synchronize a data structure stored in write database 431 with a data structure stored in one or more read databases (e.g., read database 432, read database 433). For example, after database interface 420 creates a data structure in write database 431, database interface 420 may create a copy of the data structure in read database 432 (and/or read database 433) such that the copies of the data structure in write database 431 and read database 432 (and/or read database 433) are exactly the same. As another example, after database interface 420 updates a data structure stored in write database 431, database interface 420 may update a corresponding data structure stored in read database 432 (and/or read database 433) such that the data structure in write database 431 and the corresponding data structure in read database 432 (and/or read database 433) are exactly the same.

In some embodiments, for a query, database interface 420 may obtain the requested data specified in the query from one or more read databases (also referred herein as query databases) rather than write database 431. For example, database interface 420 may receive a request from a user device for an inquiry for the status of a return (i.e., a query). Database interface 420 may be configured to obtain the relevant data from read database 432 and transmit the obtained data to the user device.

In some embodiments, database interface 420 may take the form of servers, general-purpose computers, mainframe computers, or any combination of these components. Database interface 420 may include a memory storing instructions for at least one processor configured to perform the functions thereof disclosed herein.

In some embodiments, returns eventstore 361 and database interface 420 may be implemented as a single computing device. Alternatively, returns eventstore 361 and database interface 420 may locate in different devices and communicate with each other via a network.

A write database and one or more read databases may be located in the same location. Alternatively, a write database and one or more read databases may locate in different locations. For example, write database 431 may be located in a first location, read database 432 may be located in a second location, and read database 433 may be located in a third location. In some embodiments, two or more of write database 431, read database 432, and read database 433 may be configured to connect to each other via a network. In some embodiments, for a query, database interface 420 may obtain data from a particular data structure from one of read databases based on the location of the requesting device. For example, database interface 420 may rely data from a read database that is located closer to the requesting device.

In some embodiments, write database 431, read database 432, and/or read database 433 may include one or more Oracle™ databases, Sybase™ databases, or other relational databases or non-relational databases, such as Hadoop™ sequence files, HBase™, or Cassandra™. write database 431, read database 432, and/or read database 433 may include one or more NoSQL databases such as HBase, MongoDB™ or Cassandra™. Alternatively, write database 431, read database 432, and/or read database 433 may include relational databases such as Oracle, MySQL and Microsoft SQL Server. In some embodiments, write database 431, read database 432, and/or read database 433 may take the form of servers, general-purpose computers, mainframe computers, or any combination of these components.

Figure 5A:
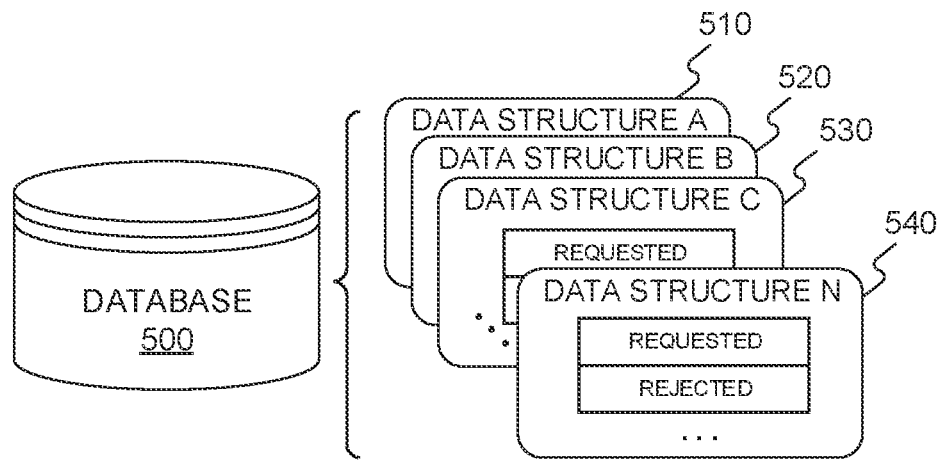
FIG. 5A illustrates a pictographic representation of an exemplary database, consistent with some embodiments of the present disclosure.

FIG. 5A illustrates a pictographic representation of an exemplary database 500, consistent with some embodiments of the present disclosure. Database 500 may be used for implementing one or more of the databases disclosed herein (e.g., write database 431, read database 432, read database 433, etc.). As illustrated in FIG. 5A, database 500 may include a plurality of data structure, including a data structure A 510, a data structure B 520, a data structure C 530, . . . , and a data structure N 540. Each of the data structures may correspond to a return. For example, return module 379*a* may receive a first return request initiated by a first customer via a first user device. Return module 379*a* may initiate a first return process for the first customer (also referred to as the first return), and transmit information relating to the first return request to database interface 420 via, for example, requesting device 411. Database interface 420 may be configured to create data structure A 510 for the first return, including a first return event entry (e.g., a return requested). As another example, return module 379*a* may receive a second return request initiated by a second customer via a second user device. Return module 379*a* may initiate a second return process for the second customer (also referred to as the second return), and transmit information relating to the second return request to database interface 420 via, for example, requesting device 411. Database interface 420 may be configured to create data structure B 520 for the first return, including a first return event entry (e.g., a return requested).

Figure 5B:
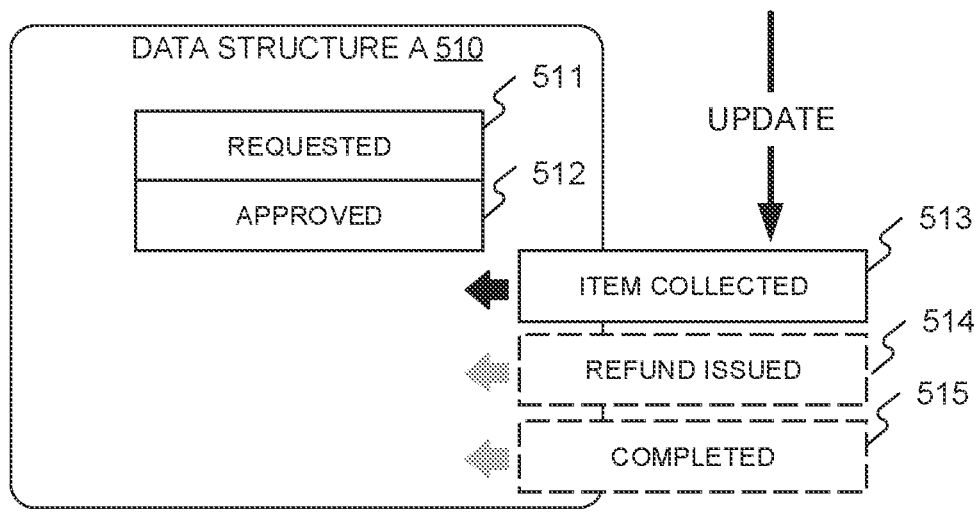
FIG. 5B illustrates a pictographic representation of an exemplary data structure, consistent with some embodiments of the present disclosure.

FIG. 5B illustrates a pictographic representation of an exemplary data structure A 510, consistent with some embodiments of the present disclosure. As illustrated in FIG. 5B, data structure A 510 may include a first entry 511 relating to the return request and a second entry 512 relating to the approval of the return request. First entry 511 may include information relating to the return request, including, for example, a timestamp of receiving the return request by a requesting device (e.g., a user device or a device associated with a customer service representative) via return module 379*a*, the customer ID, the description of the item(s) subject to be returned, or the like, or a combination thereof. Database interface 420 may receive a request for creating a data structure for the return and create data structure A 510 in write database 431 (as described elsewhere in this disclosure). Database interface 420 may also create first entry 511 for the return request event in data structure A 510. Return module 379*a* (or other components of the sub-systems disclosed herein) may approve the return request and transmit the user device instructions for returning the item(s). Database interface 420 may receive the information relating to the approval of the return request and create second entry 512 for the event in data structure A 510. In some embodiments, database interface 420 may insert second entry 512 into data structure A 510. For example, database interface 420 may insert second entry 512 after the last entry (i.e., first entry 511 at this point). Alternatively, database interface 420 may place second entry 512 on the top of first entry 511. Return module 379*a* (or other components of the sub-systems disclosed herein) may also receive information relating to the returned item(s) and transmit a request for updating data structure A 510 to database interface 420, which may create a third entry 513 data structure A 510. Return module 379*a* (or other components of the sub-systems disclosed herein) may further receive information relating to the refund issued to the customer (if any) and determine that the first return is completed. Return module 379*a* (or other components of the sub-systems disclosed herein) may also transmit one or more requests for updating data structure A 510 to database interface 420, which may create a fourth entry 514 and a fifth entry 515 in data structure A 510 accordingly.

FIG. 6 illustrates a flowchart of an exemplary process 600 for updating a data structure, consistent with some embodiments of the present disclosure. While database interface 420 is described herein as an exemplary component that performs the steps of process 600, one skilled in the art would understand that other component(s) of the sub-systems described in this disclosure can also be configured to perform one or more steps of process 600.

At step 601, database interface 420 may receive data relating to a first return request initiated by a first customer via a first user device. For example, a first customer may initiate a first return request via a user device, which may be received by return module 379*a*. Return request may include time information relating to the return request (e.g., the time, date, and/or time zone relating to the return request, etc.), information relating to the customer (e.g., the customer's user ID, order history, and/or return history, etc.), information relating to the original order associated with the return request (e.g., the item(s) to be returned, the condition of the item(s), the monetary amount of the item(s) to be returned, etc.), information relating to the transaction (e.g., the billing information, the shipping information, the refund (if any), etc.), or the like, or a combination thereof. Return module 379*a* may transmit data relating to the first return request to database interface 420 via, for example, requesting device 411.

At step 603, database interface 420 may create a first data structure for the first return request into a first database. The first database may be a write (or command) database. For example, database interface 420 may create a data structure A 510 in write database 431, as illustrated in FIG. 5B (with no entries in data structure A 510 at this point).

At step 605, database interface 420 may create a first event for the first return request. For example, database interface 420 may create a first entry 511 as a first event (i.e., the return request initiated) as illustrated in FIG. 5B.

At step 607, database interface 420 may store the first event in the first data structure. For example, database interface 420 may store first entry 511 in data structure A 510 stored in write database 431, as illustrated in FIG. 5B.

At step 609, database interface 420 may receive data relating to an update associated with the first return request. For example, return module 379*a* may approve the return request based on rules for validating return requests, and transmit a request for updating the data structure associated with the first return and data relating to the approval of the return request (i.e., an update) to database interface 420.

In some embodiments, the update associated with the first return request may include a decline of the first return request based on a return rule and data relating to the first customer, a received item associated with the first return request, information relating to issuing a refund associated with the first return request, or the like, or a combination thereof.

At step 611, database interface 420 may create a second event for the update. For example, database interface 420 may create a second entry 512 as a second event for the update (i.e., the approved return request).

In some embodiments, database interface 420 may determine whether a request relating to a data structure is a command or a query. If the request is a command, database interface 420 may update the data structure in a write database (e.g., write database 431) based on the information associated with the request. On the other hand, if the request is a query, database interface 420 may obtain data relating to the request from one or more requesting devices (e.g., requesting device 411, requesting device 412), and process 600 may end at step 611.

At step 613, database interface 420 may insert the second event into the first data structure. For example, database interface 420 may insert second entry 512 after first entry 511, which is the last entry of data structure A 510, as illustrated in FIG. 5B. Alternatively, database interface 420 may place second entry 512 on the top of the first entry in data structure A 510.

Database interface 420 may also update the data structure if there is any update. For example, return module 379a (or other components of the sub-systems disclosed herein) may receive information relating to the returned item(s) and transmit a request for updating data structure A 510 to database interface 420, which may create a third entry 513 data structure A 510. Return module 379a (or other components of the sub-systems disclosed herein) may further receive information relating to the refund issued to the customer (if any) and determine that the first return is completed. Return module 379a (or other components of the sub-systems disclosed herein) may also transmit one or more requests for updating data structure A 510 to database interface 420, which may create a fourth entry 514 and a fifth entry 515 in data structure A 510 accordingly.

Database interface 420 may also synchronize the first data structure stored in the first database with a second data structure stored in a second database. For example, database interface 420 may synchronize data structure A 510 stored in write database 431 with a data structure stored in one or more read databases (e.g., read database 432, read database 433). For example, after database interface 420 creates data structure A 510 in write database 431, database interface 420 may create a copy of data structure A 510 in read database 432 (and/or read database 433) such that the copies of data structure A 510 in write database 431 and read database 432 (and/or read database 433) are exactly the same. In some embodiments, database interface 420 may synchronize the first data structure stored in the first database with a second data structure stored in a second database immediately after a change is made to the first data structure by database interface 420. Alternatively or additionally, database interface 420 may update the first data structure and the second data structure simultaneously. Alternatively or additionally, database interface 420 may synchronize the first data structure stored in the first database with a second data structure stored in a second database periodically.

In some embodiments, database interface 420 may also synchronize the second data structure stored in the first database with a fourth data structure stored in the second database, the third data structure being different from the fourth data structure.

In some embodiments, database interface 420 may receive an inquiry for a status of the first return request from the first customer via the first user device. Database interface 420 may determine that the inquiry is a query and read the second data structure from the second database (e.g., read database 432) instead of the first database (write database 431). Database interface 420 may also generate a response to the inquiry based on data from the second data structure. For example, database interface 420 may obtain the event entries in the second data structure and generate a message indicating the most recent status of the return based on the obtained data. Database interface 420 may also transmit, via a network (and/or another component of the sub-systems disclosed herein), data relating to the response to the first user device for displaying the response in a user interface in the first user device.

In some embodiments, before obtaining data from the second database (e.g., read database 432), database interface 420 may determine whether the second data structure stored in the second database is up to date with the first data structure. For example, database interface 420 may comparing the updating log of the second data structure against that of the first data structure, and determine whether the second data structure stored in the second database is up to date with the first data structure based on the comparison. If the data structure is up to date, database interface 420 may read the second data structure from the second database. On the other hand, if database interface 420 determines that the second data structure stored in the second database is not up to date with the first data structure, database interface 420 may request (or perform) a synchronization by the second database of the first data structure and the second data structure. Database interface 420 may also read the synchronized second data structure from the second database.

In some embodiments, database interface 420 may also receive data relating to a second return request initiated by a second customer via a second user device and create a second data structure (e.g., data structure B 520) for the second return request into the first database (e.g., write database 431). The second data structure may be different from the first data structure (e.g., data structure A 510). Database interface 420 may further create a third event for the second return request and store the third event in the second data structure. Database interface 420 may also synchronize the second data structure stored in the first database with a fourth data structure stored in the second database (e.g., read database 432). The third data structure may be different from the fourth data structure.

Figure 7:
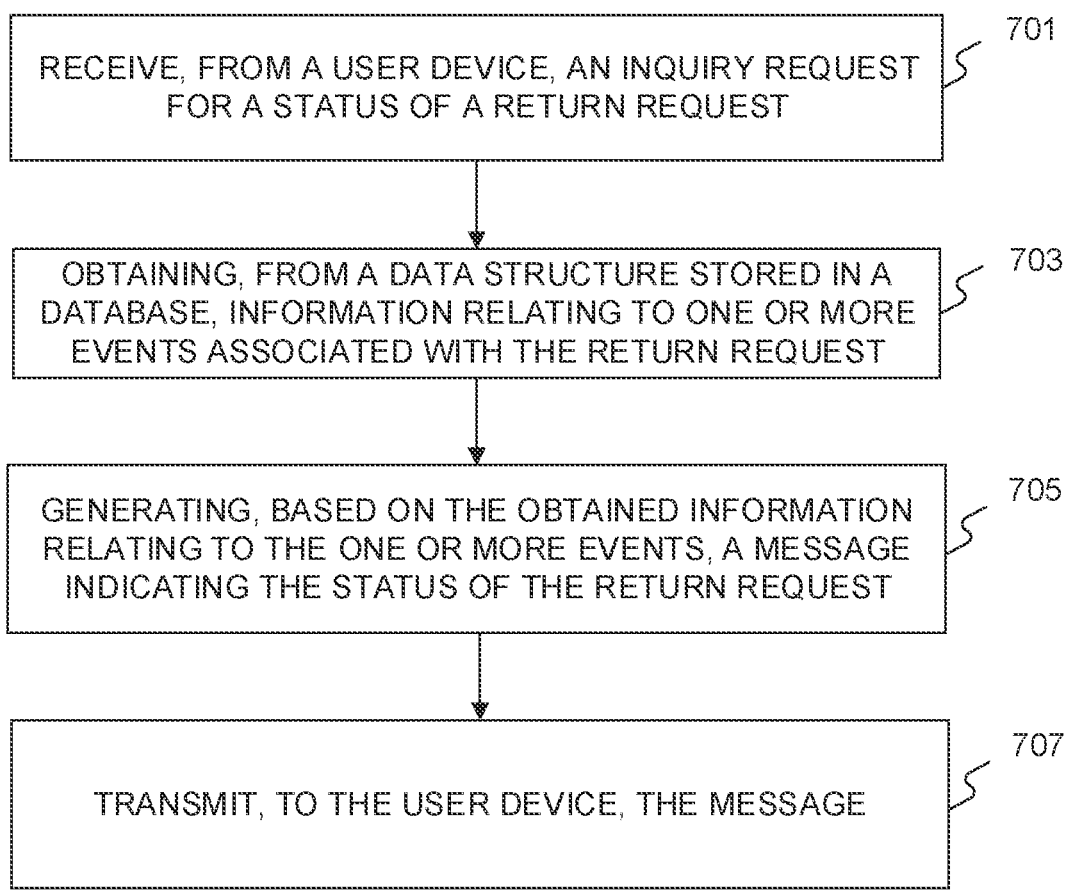
FIG. 7 illustrates a flowchart of an exemplary process for responding to an inquiry, consistent with some embodiments of the present disclosure.

FIG. 7 illustrates a flowchart of an exemplary process 700 for responding to an inquiry, consistent with some embodiments of the present disclosure. While database interface 420 is described herein as an exemplary component that performs the steps of process 700, one skilled in the art would understand that other component(s) of the sub-systems described in this disclosure can also perform one or more steps of process 700.

At step 701, database interface 420 may receive, from a requesting device (directly or via another component of the subsystems described in this disclosure), an inquiry request for the status of the return request. For example, a customer may request a status update regarding a return request via a web page or an application (e.g., a mobile phone application). As another example, a device associated with a customer service representative may send an inquiry request for the status of the return request. An inquiry request may include an identifier of the return (e.g., a return merchandise authorization (RMA) number, etc.), the information relating to the customer (e.g., the customer's name, ID, etc.), the order involved in the return (e.g., the order number, etc.), the returned item(s) (e.g., the description of the item(s), etc.), or the like, or a combination thereof.

At step 703, in response to the received inquiry request, database interface 420 may obtain, from a data structure stored in a read database, information relating to one or more events associated with the return request. For example, database interface 420 may identify a data structure stored in the read database based on the information included in the inquiry request. Database interface 420 may also read the data relating to the inquiry data from the data structure.

In some embodiments, before obtaining information relating to one or more events, database interface 420 may check whether the data stored in the data structure in the read database is up to date with a corresponding data structure stored in a write database. For example, database interface 420 may compare the updating log of the data structure in the read database against that of the corresponding data structure stored in the write database. If the data structure is up to date, database interface 420 may read data from the data structure stored in the read database. On the other hand, if database interface 420 determines that the data structure stored in the read database is not up to date, database interface 420 may request (or perform) a synchronization of the data structure of the read database with the corresponding data structure of the write database. Database interface 420 may also read the synchronized data structure from the read database.

At step 705, database interface 420 may generate, based on the obtained information relating to the return status, a message indicating the status of the return request. An exemplary message may include information relating to the event(s) of the return process (e.g., the return requested, the return approved, the shipping label sent, the return package tracking information, etc.), the time information relating to the event(s) (e.g., the time, the date, the timestamp, estimated completed time, etc.), or the like, or a combination thereof. For example, database interface 420 may obtain data relating to one or more events from the data structure. Database interface 420 may also generate a message including a log of the event(s) based on the obtained data.

At step 707, database interface 420 may transmit, to the user device, the message.

While the present disclosure has shown and described methods and systems for storing and accessing data for return events, the embodiments disclosed herein are not limited to return events and may be used for storing data relating to other types of events. For example, in addition to or alternative to storing data relating to return events, the embodiments may also be used for storing data relating to order events, exchange events, transaction events, or the like, or a combination thereof.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented database system for storing data relating to a series of events, the system comprising:
 a memory storing instructions; and
 at least one processor configured to execute the instructions to perform a process comprising:
  creating a first data structure in a first database;
  storing a first event in the first data structure;
  receiving data relating to an update;
  creating a second event for the update;
  inserting the second event into the first data structure;
  updating any one of the first data structure stored in the first database or a second data structure stored in a second database;
  receiving a request for accessing information relating to one or more events from a requesting device;
  determining an identity of the requesting device;
  determining, based on the identity of the requesting device, whether the request is a read-only query or a command; and
  based on whether the request is a read-only query or a command, accessing one of the first data structure or the second data structure.

2. The system of claim 1, wherein the process further comprises:
 synchronizing the first data structure stored in the first database with a second data structure stored in a second database.

3. The system of claim 2, wherein synchronizing the first data structure stored in the first database with the second data structure stored in the second database comprises synchronizing the first data structure stored in the first database with a second data structure stored in the second database periodically.

4. The system of claim 2, wherein synchronizing the first data structure stored in the first database with the second data structure stored in the second database comprises synchronizing the first data structure stored in the first database with a second data structure stored in the second database when a change is made to the first data structure.

5. The system of claim 2, wherein the process further comprises:
 receiving an inquiry for a status of one or more events from a requesting device;
 reading the second data structure from the second database;

generating a response to the inquiry based on the second data structure; and transmitting data relating to the response to the requesting device for displaying the response in a user interface.

6. The system of claim 5, wherein reading the second data structure from the second database comprises:

determining whether the second data structure stored in the second database is up to date with the first data structure; and in response to a determination that the second data structure stored in the second database is up to date with the first data structure, reading the second data structure from the second database.

7. The system of claim 5, wherein reading the second data structure from the second database comprises:

determining whether the second data structure stored in the second database is up to date with the first data structure; and in response to a determination that the second data structure stored in the second database is not up to date with the first data structure, requesting a synchronization by the second database of the first data structure and the second data structure; and reading the synchronized second data structure from the second database.

8. The system of claim 2, wherein:

the first database is a command database; and the second database is a query database.

9. The system of claim 2, wherein the process further comprises:

transmitting data relating to the second event to a requesting device for displaying the data relating to the second event in a user interface.

10. The system of claim 2, wherein the process further comprises:

creating a second data structure in the first database, the second data structure being different from the first data structure;

creating a third event; and storing the third event in the second data structure.

11. The system of claim 10, wherein the process further comprises:

synchronizing the first data structure stored in the first database with a third data structure stored in a second database; and synchronizing the second data structure stored in the first database with a fourth data structure stored in the second database, the third data structure being different from the fourth data structure.

12. The system of claim 1, wherein the update comprises a decline message based on data relating to the first customer.

13. The system of claim 1, wherein receiving the update comprises receiving information relating to a received item.

14. The system of claim 1, wherein receiving the update comprises receiving information relating to issuing a refund.

15. A computer-implemented method for storing data relating to a series of events, comprising:

creating a first data structure in a first database;

creating a first event;

storing the first event in the first data structure;

receiving data relating to an update;

creating a second event for the update;

inserting the second event into the first data structure;

updating any one of the first data structure stored in the first database or a second data structure stored in a second database;

receiving a request for accessing information relating to one or more events from a requesting device;

determining an identity of the requesting device;

determining, based on the identity of the requesting device, whether the request is a read-only query or a command; and based on whether the request is a read-only query or a command, accessing one of the first data structure or the second data structure.

16. The method of claim 15, further comprises:

synchronizing the first data structure stored in the first database with a second data structure stored in a second database.

17. The method of claim 16, wherein synchronizing the first data structure stored in the first database with the second data structure stored in the second database comprises synchronizing the first data structure stored in the first database with a second data structure stored in the second database periodically.

18. The method of claim 16, wherein synchronizing the first data structure stored in the first database with the second data structure stored in the second database comprises synchronizing the first data structure stored in the first database with a second data structure stored in the second database when a change is made to the first data structure.

19. The method of claim 16, further comprises:

receiving an inquiry for a status of one or more events from a requesting device;

reading the second data structure from the second database;

generating a response to the inquiry based on the second data structure; and transmitting data relating to the response to the requesting device for displaying the response in a user interface.

20. The method of claim 16, wherein:

the first database is a command database; and the second database is a query database.

* * * * *